(12) United States Patent
Rao et al.

(10) Patent No.: US 6,915,196 B2
(45) Date of Patent: Jul. 5, 2005

(54) METHOD FOR OPERATING A VEHICLE CRASH SAFETY SYSTEM IN A VEHICLE HAVING A PRE-CRASH SENSING SYSTEM AND COUNTERMEASURE SYSTEMS

(75) Inventors: Manoharprasad K. Rao, Novi, MI (US); Kwaku Prakah-Asante, Commerce Township, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/605,336

(22) Filed: Sep. 23, 2003

(65) Prior Publication Data

US 2005/0065688 A1 Mar. 24, 2005

(51) Int. Cl.[7] ............................................. G08G 1/16
(52) U.S. Cl. ................................... 701/45; 280/735
(58) Field of Search ............................ 701/45; 280/734, 280/735, 801.1; 348/148; 342/70, 71, 72

(56) References Cited

U.S. PATENT DOCUMENTS

| | | | | |
|---|---|---|---|---|
| 5,413,378 A | * | 5/1995 | Steffens et al. | ............. 280/735 |
| 5,529,138 A | * | 6/1996 | Shaw et al. | .................. 180/169 |
| 5,541,590 A | * | 7/1996 | Nishio | ......................... 340/903 |
| 5,633,705 A | * | 5/1997 | Asayama | .................... 356/3.14 |
| 5,707,078 A | * | 1/1998 | Swanberg et al. | ........... 280/739 |
| 5,748,477 A | | 5/1998 | Katoh | |
| 5,785,347 A | * | 7/1998 | Adolph et al. | ............... 280/735 |
| 5,835,873 A | | 11/1998 | Darby et al. | |
| 6,370,461 B1 | * | 4/2002 | Pierce et al. | ................... 701/45 |
| 6,420,996 B1 | | 7/2002 | Stopczynski et al. | |
| 6,434,461 B1 | * | 8/2002 | Jacob et al. | ................... 701/45 |
| 6,516,258 B1 | * | 2/2003 | Herrmann | ..................... 701/45 |
| 6,519,519 B1 | | 2/2003 | Stopczynski | |
| 6,560,520 B2 | * | 5/2003 | Yokota et al. | ................. 701/45 |
| 6,571,161 B2 | * | 5/2003 | Browne et al. | ............... 701/45 |
| 6,772,057 B2 | * | 8/2004 | Breed et al. | ................... 701/45 |
| 2001/0037170 A1 | | 11/2001 | Morell et al. | |
| 2003/0060956 A1 | | 3/2003 | Rao et al. | |
| 2003/0076981 A1 | | 4/2003 | Smith et al. | |

* cited by examiner

Primary Examiner—Michael J. Zanelli
(74) Attorney, Agent, or Firm—Frank A. MacKenzie; Artz & Artz, P.C.

(57) ABSTRACT

A vehicle crash safety system (10) for an automotive vehicle has a pre-crash sensing system (17) generating a pre-crash signal, a vehicle dynamics detector (32) generating a vehicle dynamics signal, a pre-crash countermeasure system (40), and a pre-crash controller (12) controlling the pre-crash countermeasure system in response to the pre-crash signal and the vehicle dynamics signal. Vehicle crash safety system (10) also has a coordinated safety system controller (44) coupled to the pre-crash controller (12), an early crash sensing system (46) and an early crash countermeasure system (45). The coordinated safety system controller controls the early crash countermeasure in response to the early crash signal and signals from the pre-crash controller.

20 Claims, 5 Drawing Sheets

METHOD FOR OPERATING A VEHICLE CRASH SAFETY SYSTEM IN A VEHICLE HAVING A PRE-CRASH SENSING SYSTEM AND COUNTERMEASURE SYSTEMS

BACKGROUND OF INVENTION

The present invention relates to vehicle crash safety systems for automotive vehicles, and more particularly to vehicle crash safety systems having coordinated countermeasures operated in response to pre-crash detection and early crash detection.

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are deployed.

In certain crash situations it would be desirable to provide information before forces actually act upon the vehicle when a collision is unavoidable. Such systems may activate pre-crash countermeasures when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible early crash countermeasures, including airbags, require extremely reliable sensing systems for pre-crash activation. However, the coordination of early crash and pre-crash countermeasures is typically not taken into consideration.

It would therefore be desirable to provide a system that coordinates activation of pre-crash countermeasures with early crash countermeasures.

SUMMARY OF INVENTION

The present invention provides an improved vehicle crash safety system that coordinates activation of pre-crash countermeasures with early crash countermeasures. Pre-crash refers to vehicle system conditions before contact with an object occurs. Early crash refers to when contact occurs, i.e., the beginning of a collision.

In one aspect of the invention, a vehicle crash safety system for an automotive vehicle has a pre-crash sensing system generating a pre-crash signal, a vehicle dynamics detector for detecting the host vehicle dynamic states, a pre-crash countermeasure system, and a pre-crash controller controlling the pre-crash countermeasure system in response to the pre-crash signal and the host vehicle dynamic states. The vehicle crash safety system also has a coordinated safety system controller coupled to an early crash sensing system, the said pre-crash controller and an early crash countermeasure system. The coordinated safety system controller controls the early crash countermeasure in response to the early crash signal and a signal from the pre-crash controller.

In a further aspect of the invention, a method for operating a vehicle crash safety system for an automotive vehicle comprises generating a pre-crash signal from a pre-crash sensing system, a vehicle dynamics state assessment from the vehicle dynamics detector signal, controlling a pre-crash countermeasure system in response to the pre-crash signal and the host vehicle dynamics state, generating an early crash signal from an early crash sensing system, and controlling an early crash countermeasure system in response to the early crash signal and a signal based on pre-crash signal and vehicle dynamics state.

One advantage of the invention is that because the pre-crash and early crash systems are coordinated better occupant protection may be afforded.

Another advantage of the invention is that unintentional or inadvertent activation of countermeasure devices is minimized.

Other advantages and features of the present invention will become apparent when viewed in light of the detailed description of the preferred embodiment when taken in conjunction with the attached drawings and appended claims.

DETAILED DESCRIPTION

Figure 1:
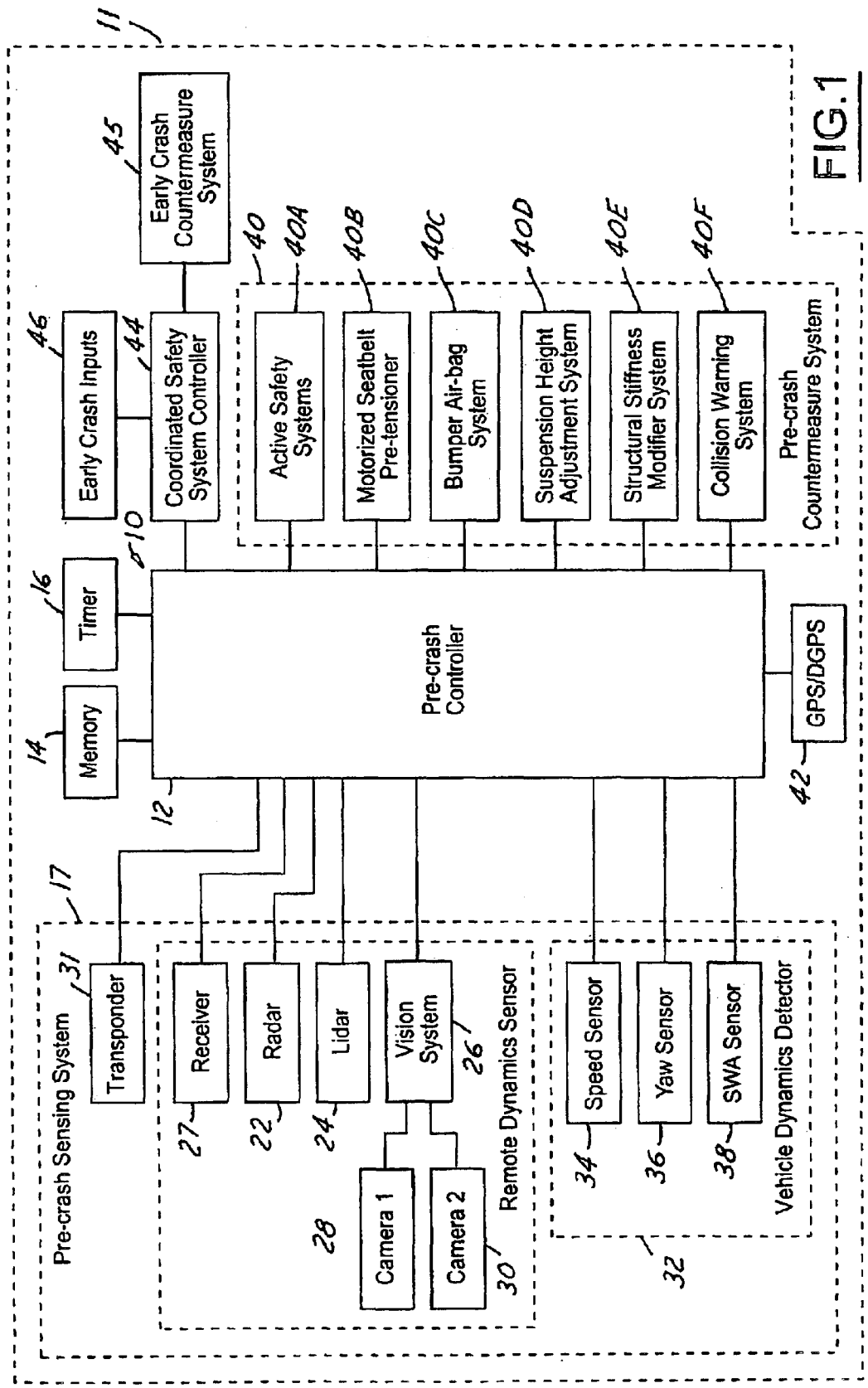
FIG. 1 is a block diagrammatic view of a vehicle crash safety system according to the present invention.

In the following figures the same reference numerals will be used to identify the same components. While the present invention is illustrated with respect to several types of remote object sensors, various types and combinations of remote object sensors may be used as will be further described below.

Referring now to FIG. 1, a vehicle crash safety system 10 for an automotive vehicle 11 has a pre-crash controller 12. Pre-crash controller 12 is preferably a microprocessor-based controller that is coupled to a memory 14 and a timer 16. Memory 14 and timer 16 are illustrated as separate components from that of pre-crash controller 12. However, those skilled in the art will recognize that memory 14 and timer 16 may be incorporated into pre-crash controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within pre-crash controller 12. Timer 16 is capable of timing the duration of various events as well as counting up or counting down.

A pre-crash sensing system 17 is coupled to pre-crash controller 12. Pre-crash sensing system 17 generates an object signal in the presence of an object within its field of view. Pre-crash sensing system 17 may be comprised of one of a number of types of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. When used as a stereo pair, cameras 28 and 30 acting together are also capable of detecting the distance of an object from the vehicle. Alternatively, as will be further described below, radar 22 or lidar 24 may be used to detect an object within a detection zone and vision system 26 may be used to confirm the presence of the object within the decision zone and to provide the size of the object to pre-crash controller 12. In another embodiment of the invention vision system consisting of cameras 1 and 2, alone may use established triangulation techniques to determine the presence of an object and the distance from the vehicle as well as the object's size that may include area, height or width, or combinations thereof.

The pre-crash sensing system 17 may also include a receiver 27 and a transponder 31. Transponder 31 may be used to send various information to other vehicles. Receiver 27 is used to receive information from the other vehicles. The various information includes the coordinates, and may also include various other information including the braking capability, road conditions, location, time to impact and distance to collision.

The vehicle crash safety system 10 includes a vehicle dynamics detector 32 coupled to pre-crash controller 12. A speed sensor 34 is also coupled to pre-crash controller 12. Speed sensor 34 may be one of a variety of speed sensors known to those skilled in the art. For example, a suitable speed sensor may include a sensor at every wheel that is averaged by pre-crash controller 12. Preferably, controller translates the wheel speeds into the speed of the vehicle. Suitable type of speed sensors 34 may include, for example, toothed wheel sensors such as those employed on anti-lock brake systems.

The vehicle dynamics detector 32 may comprise various numbers or combinations of sensors. The vehicle dynamics detector 32 may include a yaw rate sensor 36, and a steering wheel angle sensor 38. Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within pre-crash controller 12 in a known manner.

Steering wheel angle sensor 38 provides a steering wheel angle signal to pre-crash controller 12. The steering wheel angle signal corresponds to the steering wheel angle of the hand wheel of the automotive vehicle. The yaw rate sensor 36 and the vehicle speed sensor 35 or the steering wheel angle sensor 38 alone, or the above sensors in combination, may be used to indicate a curved road.

Pre-crash controller 12 may be coupled to a GPS/DGPS system 42. Global positioning system (GPS) 42 generates a position signal for the vehicle. Global positioning system 42 updates its position at a predetermined interval. Typical interval update periods may, for example, be one second. Although this interval may seem long compared to a crash event, the vehicle position may be determined based upon the last up update from the GPS 42 and velocity and acceleration information measured within the vehicle.

Pre-crash controller 12 is used to control the activation of a pre-crash countermeasure system 40. Each pre-crash countermeasure may have an individual actuator associated therewith. In that case, pre-crash controller 12 may direct the individual pre-crash countermeasure actuator to activate the pre-crash countermeasure. Various types of pre-crash countermeasure systems will be evident to those skilled in the art. Examples of a pre-crash countermeasure within pre-crash countermeasure system include active safety systems 40A such as brake assist systems, motorized occupant belt pre-tensioner 40B, bumper airbag system 40C, a suspension height adjustment system 40D, a structural stiffness modifier system 40E and a collision warning system 40F. Preferably, pre-crash controller 12 is programmed to activate the appropriate pre-crash countermeasure in response to the inputs from the various sensors.

Pre-crash controller 12 is also coupled to a coordinated safety system controller 44. The coordinated safety system controller 44 is concerned with deployment of an early crash countermeasure system in response to early crash signal obtained from the early crash sensing system 46. Although the pre-crash controller 12 and coordinated safety system controller 44 are illustrated as separate components, their functions may be incorporated into a single controller having a multi-level controller function. Both the pre-crash controller 12 and the coordinated safety system controller 44 may be microprocessor-based. The coordinated safety system controller 44 activates early crash countermeasures in response to the early crash signal from the early crash sensing system 46 and a pre-crash sensing based signal provided from the pre-crash controller 12. As will be further described below, the pre-crash controller may provide various types of information to the coordinated safety system controller 44.

Figure 2:
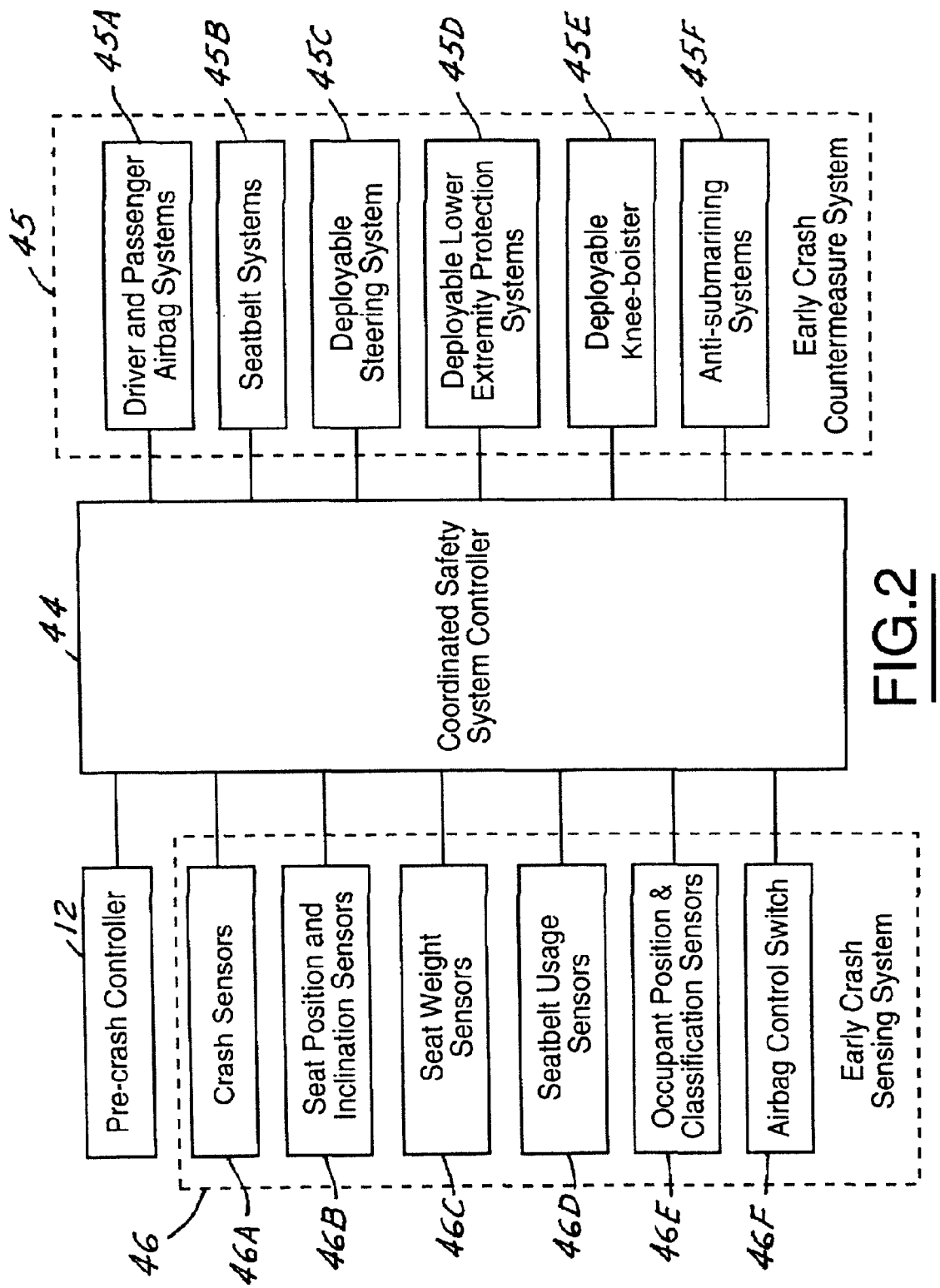
FIG. 2 is a detailed block diagram of the early crash countermeasure system and the early crash sensing system coupled to the coordinated safety system controller.

Referring now to FIG. 2, the coordinated safety system controller 44 is illustrated with early crash sensing system 46 and early crash countermeasure system 45 in further detail. Pre-crash controller 12 is also illustrated coupled to coordinated safety system controller 44.

Early crash sensing system 46 may include various sensors including a crash sensor 46A, a seat position and seat inclination sensor 46B, a seat weight sensor 46C, a seat belt usage sensor 46D, an occupant position and classification sensor 46E, and an airbag control switch 46F. Although these sensors are used, not all or further sensors may be used.

Early crash countermeasure system 45 may include various types of countermeasures for occupant protection. The early crash countermeasure system 45 is particularly suited to reduce or prevent injuries to the driver and passengers.

Early crash countermeasure system 45 may include but is not limited to a driver and passenger airbag system 45A, a seatbelt system 45B, a deployable steering system 45C, a deployable lower extremity protection system 45D, a deployable knee bolster 45E, and an anti-submarining system 45F. Anti-submarining systems may, for example, airbags mounted at the front end of the seat bottoms. Deployable steering system 45C may, for example, include steering columns that are controlled by means of pyrotechnic or explosive means. The combination of the pre-crash controller 12 and the coordinated safety system controller 44 insures that respective collision countermeasures are deployed when required before a crash and systematically tailors to the deployment of the safety systems during a crash. Outputs from the pre-crash controller, occupant state and restraints usage information and the vehicle dynamics data are provided to the coordinated safety system controller.

Figure 3:
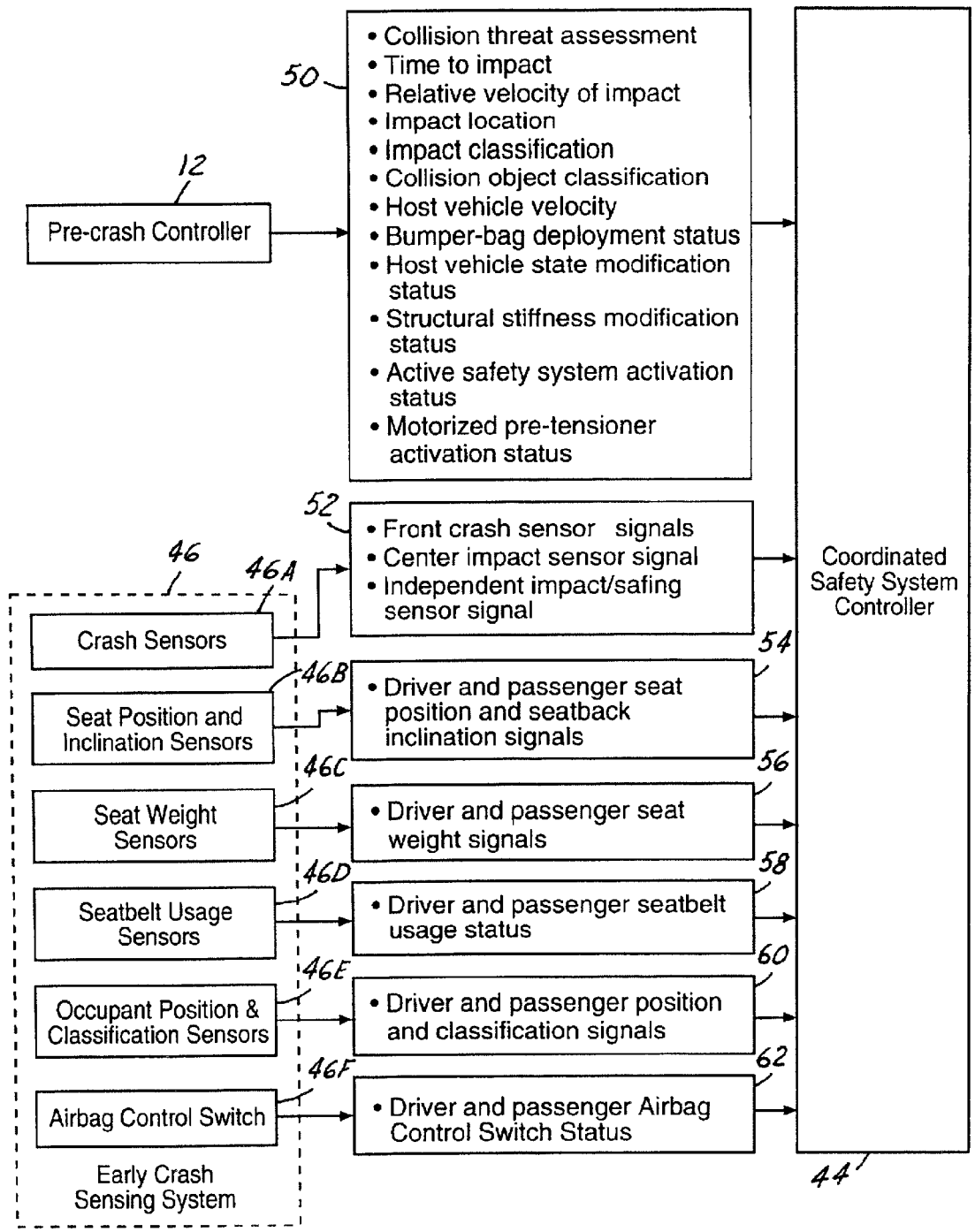
FIG. 3 is a block diagrammatic view of the pre-crash and early crash inputs to the coordinated safety system controller and their associated signals.

Referring now to FIG. 3, the early crash sensing system 46 inputs and the inputs from the pre-crash controller 12 are provided in further detail. In box 50 the pre-crash controller 12 is illustrated providing collision threat assessment, time to impact, relative velocity of impact, impact location, impact classification, collision object classification, host vehicle velocity, bumper-bag deployment status, host vehicle state modification status, structural stiffness modification status, active safety system activation status, and motorized pre-tensioner activation status to the coordinated safety system controller 44. Those skilled in the art will recognize that the pre-crash signal may contain all or some of the signals. Further, pre-crash signal may include further calculated or derived pre-crash signals.

Crash sensors 46A may, for example, provide a front crash sensor signal, a center impact sensor signal, and an independent impact/safing sensor signal. Various crash sensors are known to those skilled in the art such as accelerometer-based crash sensors that are used to activate an airbag.

Seat position and inclination sensor 46B may provide, for example, driver and passenger seat position including a seat back inclination signal.

Seat weight sensor 46C may provide a signal corresponding to the weight of the driver and the passenger on the seat.

A seatbelt usage sensor may provide driver and passenger seatbelt usage status to the coordinated safety system controller 44.

An occupant position and occupant classification sensor 46E provides driver and passenger position and classification signals to the coordinated safety system controller 44. Airbag control switch 46F may provide the coordinated safety system controller with airbag activation control switch status. Further, the airbag control switch may also provide such information to side airbags and/or side curtain airbags.

Figure 4:
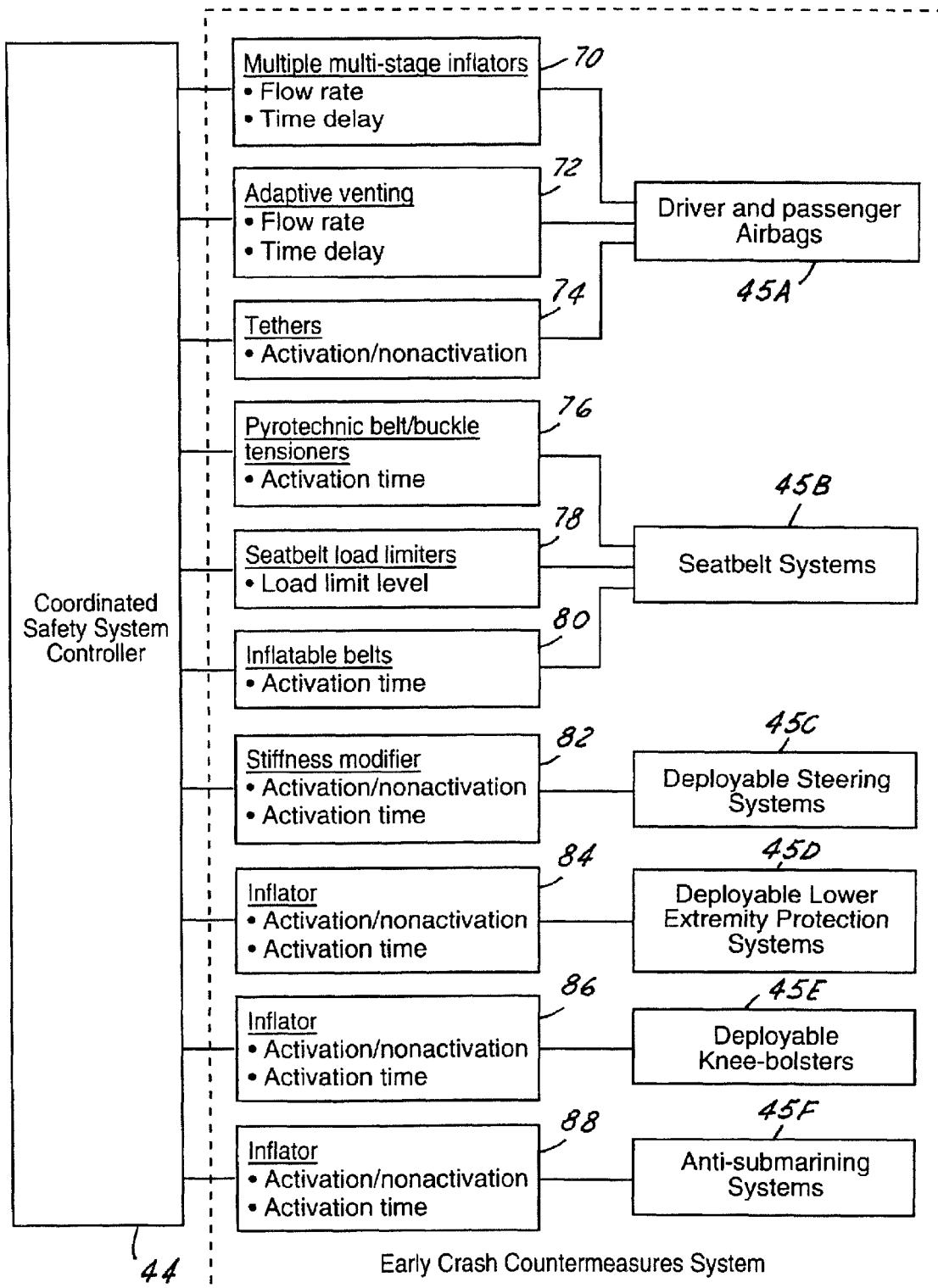
FIG. 4 is a detailed block diagrammatic view of the coordinated safety system controller output signals.

Referring now to FIG. 4, the early crash countermeasure system 45 is illustrated in further detail. The coordinated safety system controller 44 may generate various control signals for the various early crash countermeasure systems. Various signals to control various portions of the system are illustrated in boxes 70–88.

The coordinated safety system controller 44 may control multiple stage inflators 70 by controlling a flow rate and time delay signal of the passenger and driver airbags 45A. Also, adaptive venting 72 may also be provided having various flow rates and time delays calculated by the coordinated safety system controller 44. The driver and passenger airbags 45A may also have tethers 74 that may be activated or deactivated based upon the coordinated safety system controller 44 output. Seat belt systems 45B may have pyrotechnic belt/buckle tensioners 76 that have various activation times calculated by the coordinated safety system controller 44. The seatbelts may also have seatbelt load limiters 78 that have a load limit level calculated by the coordinated safety system controller 44. Seatbelt system 45B may also include an inflatable belt that has an activation time 80 calculated by the coordinated safety system controller 44. A deployable steering system 45C may have a stiffness modifier that has an activation/non-activation signal provided by the coordinated safety system controller 44. Also, an activation time may also be modified by the coordinated safety system controller 44.

The deployable lower extremity protection system 45D may have an inflator that may be activated or non-activated based on the coordinated safety system controller 44 input. Also, inflator activation time may also be provided by the coordinated safety system controller 44.

Various anti-submarining systems 45F may also be provided. The activation and non-activation of the anti-submarining systems may be provided by the coordinated safety system controller 44. This may include activating or deactivating the inflator. Further, the activation time may also be provided by the coordinated safety system controller 44.

The decision making computations incorporated in the coordinated safety system controller 44 may be based upon fuzzy reasoning, pattern recognition systems with polynomial and neural-network classifiers to determine crash conditions or lookups in a lookup table corresponding to the crash conditions.

Figure 5:
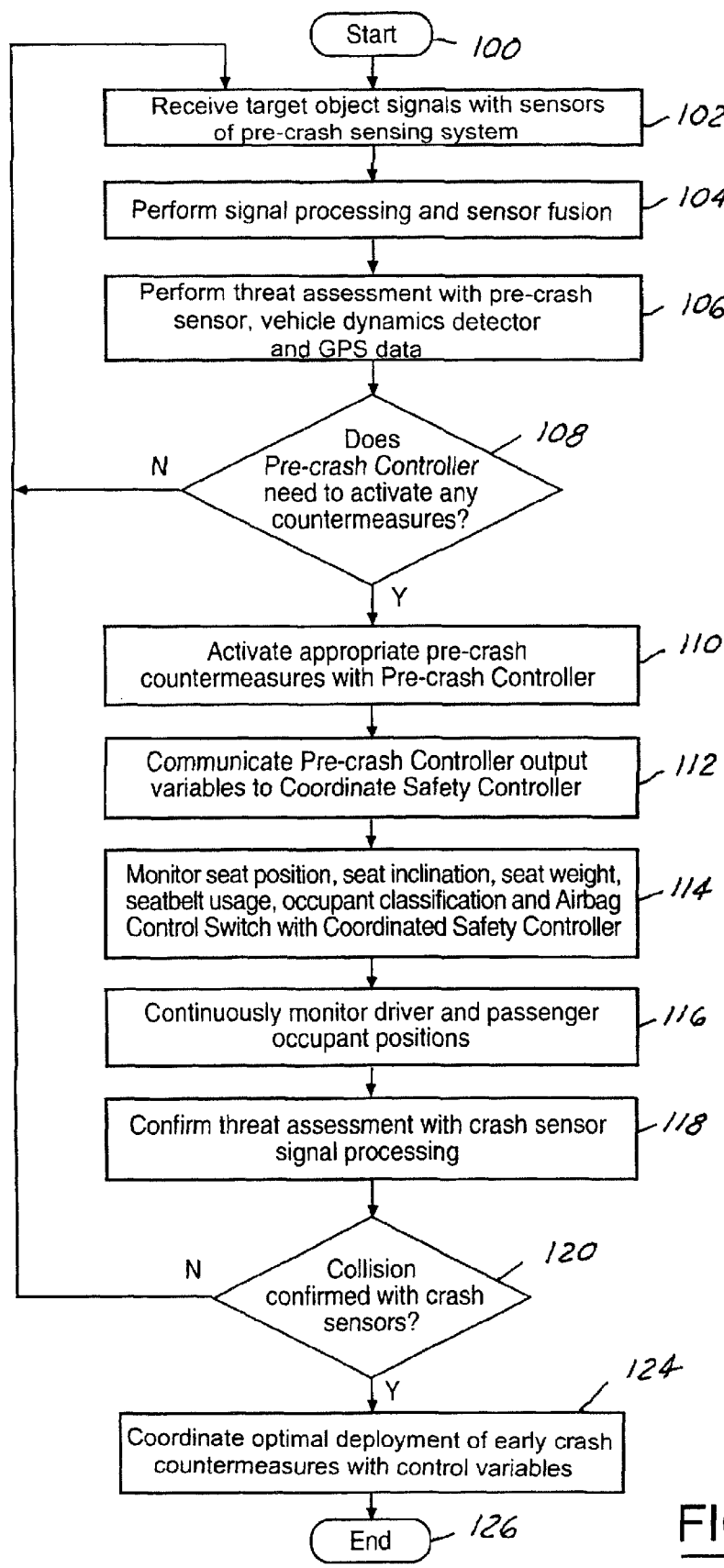
FIG. 5 is a flow chart of a method for operating the vehicle crash safety system according to the present invention.

Referring now to FIG. 5, a method for operating the vehicle crash safety system 10 is illustrated. In step 100, the system starts. In step 102, the target object signals from the sensors of the pre-crash sensing system 17 are received. In step 104 the signals are processed in the pre-crash controller and a sensor fusion is performed with all the sensor signals to determine various pre-crash conditions. In step 106, a threat assessment is made with the remote sensor signals, the vehicle dynamics detector signals, and the GPS data. In step 108, if the pre-crash controller does not need to activate any countermeasures, step 102 is executed. In step 108, if the pre-crash controller needs to activate countermeasures, step 110 is executed in which appropriate pre-crash countermeasures are activated with the pre-crash controller. In step 112, the pre-crash controller outputs are provided to the coordinated safety system controller. In step 114, the various early crash sensing system input signals 46 to the coordinated safety system controller 44 are monitored. As described above, these may include but are not limited to the seat position, seat inclination, seat weight, seatbelt usage, occupant classification, and airbag control switch status. In step 116, the driver and occupant positions are continuously monitored. In step 118, confirmation of threat assessment with the crash sensor signal is performed. In step 120, if a collision is not confirmed with the crash sensors, step 102 is re-executed. In step 120, if the collision is confirmed with the crash sensors the optimal deployment of the early crash countermeasure system 45 is coordinated by the coordinated safety system controller 44. In step 126 the system ends.

While particular embodiments of the invention have been shown and described, numerous variations and alternate embodiments will occur to those skilled in the art. Accordingly, it is intended that the invention be limited only in terms of the appended claims.

What is claimed is:

1. A vehicle crash safety system for an automotive vehicle comprising:
   a pre-crash sensing system generating a pre-crash signal;
   a vehicle dynamics detector generating a vehicle dynamics signal;
   a pre-crash countermeasure system;
   a pre-crash controller controlling the pre-crash countermeasure system in response to the said pre-crash signal and said vehicle dynamics signal, said pre-crash controller generating a pre-crash controller signal and a threat assessment signal;
   an occupant position and classification sensor generating an occupant position and classification signal;

an early crash sensing system generating an early crash signal;

an early crash countermeasure system having a plurality of early crash countermeasures; and a coordinated safety system controller coupled to the pre-crash controller, the early crash sensing system, the occupant position and classification sensor and the early crash countermeasure system, said coordinated safety system controller generating a threat confirmation signal in response to the threat assessment signal and the early crash signal, said coordinated safety system controller selecting and deselecting an appropriate early crash countermeasure from the plurality of early crash countermeasures in response to the early crash signal the occupant position and classification signal, said threat confirmation signal and said pre-crash controller signal.

2. A system as recited in claim 1 wherein the pre-crash sensing system comprises a vision system.

3. A system as recited in claim 2 wherein the vision system comprises a stereo pair of cameras.

4. A system as recited in claim 1 wherein the pre-crash sensing system comprises a receiver.

5. A system as recited in claim 1 wherein the pre-crash sensing system comprises a radar or lidar.

6. A system as recited in claim 1 wherein the pre-crash sensing system comprises a transponder.

7. A system as recited in claim 1 wherein the vehicle dynamics detector comprises a speed sensor.

8. A system as recited in claim 1 wherein the vehicle dynamics detector comprises a yaw sensor.

9. A system as recited in claim 1 wherein the vehicle dynamics detector comprises a steering wheel angle sensor.

10. A system as recited in claim 1 wherein said pre-crash controller activates said pre-crash countermeasure in response to target object distance, relative velocity and target object size signals.

11. A system as recited in claim 1 wherein the pre-crash countermeasure system comprises at least one of an active safety system, a motorized seatbelt pretensioner, a bumper airbag system, a suspension height adjustment system, a structural stiffness modifier system, and a collision warning system.

12. A system as recited in claim 1 wherein said early crash countermeasure system comprises at least one of a driver airbag system, a passenger airbag system, a seatbelt system, a deployable steering system, a deployable lower extremity protection system, a deployable knee bolster system, and an anti-submarining system.

13. A system as recited in claim 1 wherein said early crash sensing system comprises at least one crash sensor.

14. A system as sited in claim 1 wherein said early crash sensor system comprises a crash sensor, a seat position and seat inclination sensor, a seat weight sensor, a seat belt usage sensor, an occupant position and classification sensor and an airbag control switch.

15. A method for operating a vehicle crash safety system for an automotive vehicle comprising:

generating a pre-crash signal from a pre-crash sensing system;

generating a vehicle dynamics signal from a vehicle dynamics detector;

generating a global position signal for the vehicle;

controlling a pre-crash countermeasure system in response to the pre-crash signal and the vehicle dynamics signal;

generating a threat assessment signal in response to the pre-crash signal, the vehicle dynamics signal and the GPS signal;

generating an early crash signal from an early crash sensing input system;

generating an occupant position and classification signal from an occupant position and classification sensor;

generating a threat confirmation signal in response to the threat assessment signal and the early crash signal; and selecting an appropriate early crash countermeasure from a plurality of early crash countermeasures in response to the early crash signal, the occupant position and classification signals, the threat confirmation signal, and the pre-crash signal.

16. A method as recited in claim 15 further comprising coordinating a deployment of the pre-crash countermeasure system and the early crash countermeasure system.

17. A method as recited in claim 15 wherein said early crash countermeasure system comprises at least one of a driver airbag system, a passenger airbag system, a seatbelt system, a deployable steering system, a deployable lower extremity protection system, a deployable knee bolster system, and an anti-submarining system.

18. A method as recited in claim 15 wherein said early crash sensing system comprises at least one crash sensor.

19. A method as recited in claim 15 wherein the early crash sensor system comprises a crash sensor, a seat position and seat inclination sensor, a seat weight sensor, a seat belt usage sensor, an occupant position and classification sensor, and an airbag control switch.

20. A vehicle crash safety system for an automotive vehicle comprising:

a pre-crash sensing system generating a pre-crash signal;

a pre-crash countermeasure system;

a pre-crash controller controlling the pre-crash countermeasure system in response to the said pre-crash signal, said pre-crash controller generating a pre-crash controller signal and a threat assessment signal;

an occupant position and classification sensor generating an occupant position and classification signal;

an early crash sensing system generating an early crash signal;

an early crash countermeasure system having a plurality of early crash countermeasures; and a coordinated safety system controller coupled to the pre-crash controller, the early crash sensing system, the occupant position and classification sensor and the early crash countermeasure system, said coordinated safety system controller generating a threat confirmation signal in response to the threat assessment signal and the early crash signal, said coordinated safety system controller selecting and deselecting an appropriate early crash countermeasure from the plurality of early crash countermeasures in response to the early crash signal the occupant position and classification signal, said threat confirmation signal and said pre-crash controller signal.

* * * * *